United States Patent [19]
Tomizawa et al.

[11] Patent Number: 5,749,996
[45] Date of Patent: May 12, 1998

[54] METHOD OF PRODUCING RECLAIMED JOINT SHEET AND THE RECLAIMED JOINTSHEET

[75] Inventors: Tsutomu Tomizawa; Yoshihiko Tatemichi, both of Wako; Ken Fujiwara, Urawa; Masamichi Hoshi, Urawa; Hiroyuki Nakano, Urawa, all of Japan

[73] Assignees: Honda Giken Kogyo Kabushiki Kaisha; Nippon Leakless Industry Co., Ltd., both of Tokyo, Japan

[21] Appl. No.: 855,470

[22] Filed: May 13, 1997

Related U.S. Application Data

[62] Division of Ser. No. 452,142, May 26, 1995, Pat. No. 5,658,657.

[30] Foreign Application Priority Data

Jun. 17, 1994  [JP]  Japan ..................... 6-135741

[51] Int. Cl.⁶ .................................................. B29C 47/00
[52] U.S. Cl. .................. 156/244.24; 156/244.1; 156/94
[58] Field of Search .................. 156/244.1, 244.24, 156/94

[56] References Cited

U.S. PATENT DOCUMENTS

| | | | |
|---|---|---|---|
| 4,999,254 | 3/1991 | Ofstein | 428/518 |
| 5,258,222 | 11/1993 | Crivelli | 428/323 |
| 5,292,579 | 3/1994 | Kitayama et al. | 428/297.1 |

FOREIGN PATENT DOCUMENTS

| | | |
|---|---|---|
| 2 403 359 | 4/1979 | France . |
| 52-027488 | 3/1977 | Japan . |
| 61-000188 | 1/1986 | Japan . |
| 62-101680 | 5/1987 | Japan . |
| 1-063135 | 3/1989 | Japan . |
| 4-50282 | 2/1992 | Japan . |
| 4-50283 | 2/1992 | Japan . |
| 6-206281 | 7/1994 | Japan . |
| 2 013 564 | 8/1979 | United Kingdom . |
| 0 219 379 | 4/1987 | United Kingdom . |

*Primary Examiner*—Richard Weisberger
*Attorney, Agent, or Firm*—Young & Thompson

[57] ABSTRACT

A reclaimed joint sheet used as a gasket or packing member for automobiles, ships and the like consists of a first layer of a joint sheet made from a given composition, a second layer of a joint sheet made by mixing finely pulverized pieces of the joint sheet after the punching out of the joint sheet having a given particle size with the same composition for the formation of the joint sheet, and a third layer of the same joint sheet as the first layer.

1 Claim, 3 Drawing Sheets

FIG_1
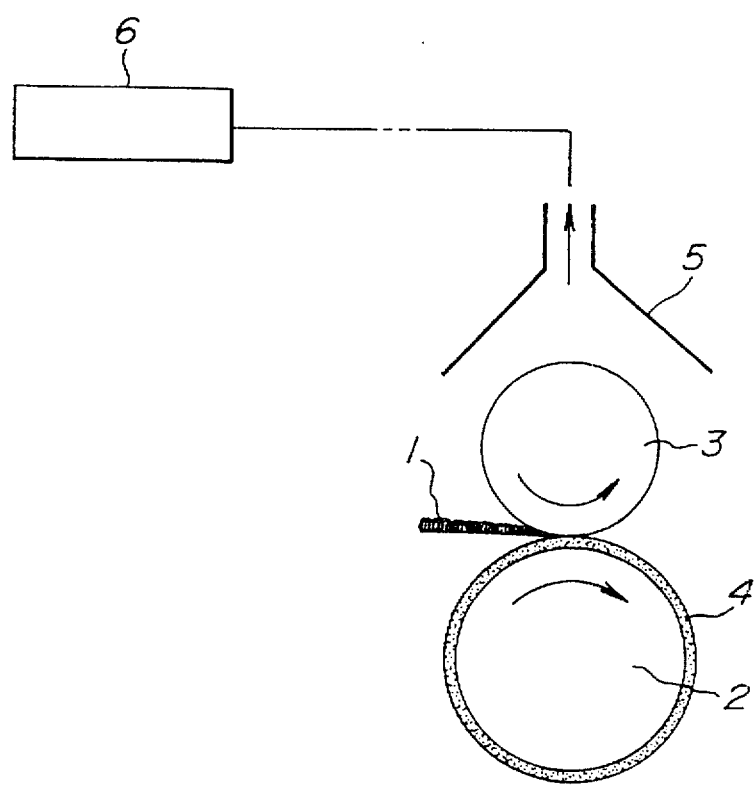

FIG_2
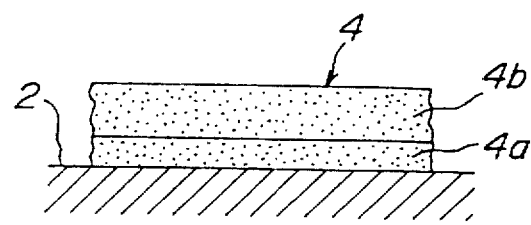
FIG_3
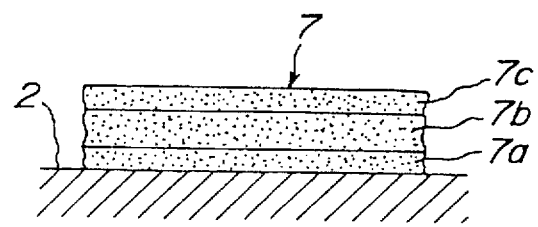

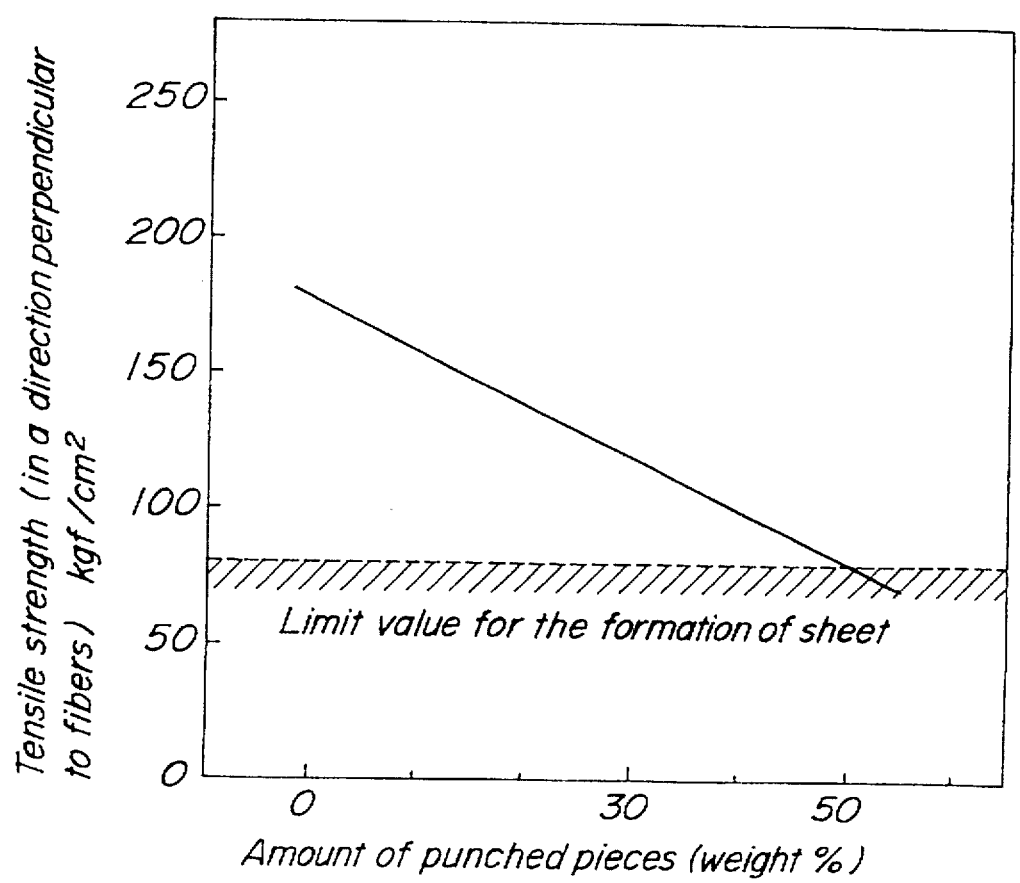
FIG_4

METHOD OF PRODUCING RECLAIMED JOINT SHEET AND THE RECLAIMED JOINTSHEET

This application is a division of application Ser. No. 08/452,142, filed May 26, 1995, now U.S. Pat. No. 5,658,657.

BACKGROUND OF THE INVENTION

1. Field of the Invention

This invention relates to a method of producing a reclaimed joint sheet among joint sheets used as a material of a gasket or a packing for automobiles, ships, various machineries and equipments and the like.

2. Description of the Related Art

The joint sheet is produced by inserting a composition for the formation of the joint sheet comprising inorganic fibers or organic fibers or a mixture thereof, a rubber material, rubber chemicals and a filler between a pair of a hot roll and a cold roll to heat and roll the composition, laminating the composition on the hot roll in form of a sheet, and then peeling off the laminated sheet from the hot roll. Next, the resulting sheet is punched out in a shape to be used as a packing.

However, when the joint sheet is punched out in form of a packing, a great amount of punched pieces corresponding to 60–70% of the joint sheet are created, so that there are problems that the material yield is low and the cost is increased.

SUMMARY OF THE INVENTION

It is, therefore, an object of the invention to solve the aforementioned problems and to provide a reclaimed joint sheet and a method of producing the same.

According to a first aspect of the invention, a composition for the formation of the joint sheet comprising inorganic fibers or organic fibers or a mixture thereof, a rubber material, rubber chemicals and a filler is kneaded and inserted between a pair of a hot roll and a cold roll to heat and roll the composition, at where the composition is heated and rolled to laminate on the hot roll in form of a sheet, and then the laminated sheet is peeled off from the hot roll to obtain a joint sheet, which is punched out in a shape to be used to form a packing, during which the punched pieces of the joint sheet are finely pulverized into particles having a particle size of not more than 1.4 mm by means of a grinder and added to the same composition for the formation of the joint sheet as mentioned above in an amount of not more than 50 weight % to produce a reclaimed joint sheet in the same manner as mentioned above.

According to a second aspect of the invention, a reclaimed joint sheet is constituted with a first layer of a joint sheet made from a composition for the formation of the joint sheet comprising inorganic fibers or organic fibers or a mixture thereof, a rubber material, rubber chemicals and a filler, a second layer of a joint sheet made by finely pulverizing punched pieces obtained after the punching out of the above joint sheet into a shape to be used as a packing into particles having a particle size of not more than 1.4 mm by means of a grinder and then adding to the same composition for the formation of the joint sheet in an amount of not more than 50 weight %, and a third layer of the same joint sheet as the first layer.

The term "punched pieces" used herein means to include redundant scraps of the composition in the formation of the sheet, defective goods, a fragment at cutting step in addition to pieces produced in the punching of the sheet.

As mentioned above, according to the invention, since pieces of the joint sheet produced in the conventional punching of the joint sheet in form of a packing can be reused, not only the material yield is improved and the cost is decreased, but also industrial wastes are decreased. Furthermore, each of the first and third layers in the reclaimed joint sheet according to the invention as an outer face is made from a joint sheet not including the punched pieces of the joint sheet, so that the seal surface becomes smooth and even and consequently sufficient sealing performance can be developed.

BRIEF DESCRIPTION OF THE DRAWINGS

The invention will be described with reference to the accompanying drawings, wherein:

FIG. 1 is a schematic view illustrating a method of producing a joint sheet;

FIG. 2 is a partially enlarged sectional view of the conventional sheet laminate laminated on a hot roll;

FIG. 3 is a partially enlarged sectional view illustrating an embodiment of the reclaimed joint sheet according to invention laminated on the hot roll; and FIG. 4 is a graph showing a relation between an amount of punched pieces added and a tensile strength of the resulting reclaimed sheet.

DESCRIPTION OF THE PREFERRED EMBODIMENTS

According to the invention, a composition 1 for the formation of the joint sheet comprising inorganic fibers or organic fibers or a mixture thereof, a rubber material, rubber chemicals and a filler, which is kneaded, for example, in an agitator (see FIG. 1), is inserted between a pair of a hot roll 2 and a cold roll 3, at where the composition 1 is heated and rolled to laminate the composition 1 on the hot roll 2 in form of a sheet 4. The laminated sheet 4 is peeled off from the hot roll and punched out into a shape to be used as a packing. Then, the punched pieces of the joint sheet are finely pulverized into particles having a particle size of not more than 1.4 mm by means of a grinder and added to the same composition for the formation of the joint sheet as mentioned above in an amount of not more than 50 weight % to produce a reclaimed joint sheet.

In FIG. 1, numeral 5 is a guide for recovering a solvent such as toluene or the like disposed above the cold roll 3, and numeral 6 a solvent recovering vessel. FIG. 2 is a partially enlarged sectional view of the conventional sheet laminate 4 laminated on the hot roll 2, in which numeral 4a is a first layer of the sheet laminate and numeral 4b a second layer thereof. FIG. 3 is a partially enlarged sectional view of a reclaimed joint sheet 7 of three layer construction according to the invention laminated on the hot roll 3, in which numeral 7a is a first layer, numeral 7b a second layer and numeral 7c a third layer.

As the inorganic fiber, use may be made of glass fiber, rock wool, various ceramic fibers, carbon fiber and metal fiber.

As the organic fiber, use may be made of aromatic polyamide fiber, fibrillated aromatic polyamide fiber, polyamide fiber, polyolefine fiber and the like.

These inorganic fibers and organic fibers may be used alone or in admixture thereof. In case of the mixture of the inorganic fiber and organic fiber, the mixing ratio of the inorganic fiber to the organic fiber is generally about 1:1–4:1 in weight ratio. Furthermore, these fibers are compounded into the joint sheet in an amount of about 10–60 weight %.

As the rubber material, use may be made of nitrile rubber (NBR), styrene-butadiene rubber (SBR), isoprene rubber (IR), chloroprene rubber (CR), ethylenepropylene rubber (EPM), fluororubber (FPM), silicone rubber (SI) and the like. The rubber material is compounded into the joint sheet in an amount of about 10–30 weight %.

As the rubber chemicals, there are used a vulcanizing agent such as sulfur, zinc oxide, magnesium oxide or the like, and a vulcanization accelerator such as thiazole compound, polyamine compound, sulfenamide compound, guanidine compound or the like. The rubber chemicals are compounded into the joint sheet in an amount of about 0.5–10 weight %.

As the filler, use may be made of clay, talc, barium sulfate, sodium bicarbonate, graphite, calcium carbonate, carbon black, diatomaceous earth, mica, aluminum sulfate, alumina hydrate, magnesium carbonate and the like. The filler is compounded into the joint sheet in an amount of about 10–70 weight %.

An example of a first composition for the first layer 4a shown in FIG. 2 is shown as follows.

| | |
|---|---|
| Fibrillated aromatic polyamide fiber | 15 weight % |
| NBR | 12 weight % |
| Rubber chemicals | 3 weight % |
| Filler | 70 weight % |
| Toluene | 0.4 l per 1 kg of the above mentioned mixture |

An example of a second composition for the second layer 4b shown in FIG. 2 is shown as follows.

| | |
|---|---|
| Fibrillated aromatic polyamide fiber | 10 weight % |
| Glass fiber | 10 weight % |
| NBR | 18 weight % |
| Rubber chemicals | 2 weight % |
| Filler | 60 weight % |
| Toluene | 0.4 l per 1 kg of the above mentioned mixture |

The above first and second compositions are used to produce a joint sheet as follows. At first, the first composition is inserted between a hot roll 2 heated to 120°–150° C. and a cold roll 3 maintained at 30°–50° C. When a thickness of the first composition reaches to 10–20% of a thickness of a desired sheet, the second composition is added onto the first composition to form a sheet laminate shown in FIG. 2. In this case, a pressure between the rolls 2, 3 is maintained at about 20–40 bar. Thereafter, the sheet laminate is subjected to a vulcanization treatment at an ambient temperature of 100°–150° C. in a drying furnace for 30–60 minutes. The thus obtained joint sheet is subjected to a punching and used as a packing.

According to the invention, the punched pieces of the above joint sheet are charged into a grinder, at where they are finely pulverized at 5000 rpm into particles having a particle size of not more than 1.4 mm and added to the same composition as mentioned above for reuse.

In the reclaimed joint sheet according to the invention, the amount of the punched pieces added is practically suitable to be not more than 50 weight %. An example of a composition for the formation of the reclaimed joint sheet containing 10 weight %, 30 weight % or 50 weight % of the punched pieces is shown as follows.

| | | | |
|---|---|---|---|
| Punched pieces | 10 weight % | 30 weight % | 50 weight % |
| Fibrillated aromatic polyamide fiber | 18 weight % | 6.5 weight % | 4 weight % |
| Glass fiber | 18 weight % | 6.5 weight % | 4 weight % |
| NBR | 18 weight % | 18 weight % | 18 weight % |
| Rubber chemicals | 2 weight % | 2 weight % | 2 weight % |
| Filler | 52 weight % | 37 weight % | 22 weight % |
| Toluene | 0.4 l per 1 kg of the above mentioned mixture | | |

Moreover, an embodiment of the reclaimed joint sheet 7 shown in FIG. 3 is shown as follows.

| Layer | first layer (7a) | second layer (7b) | third layer (7c) |
|---|---|---|---|
| Fibrillated aromatic polyamide fiber | 15 weight % | 6.4 weight % | 10 weight % |
| Glass fiber | — | 6.4 weight % | — |
| NBR | 12 weight % | 15 weight % | 18 weight % |
| Rubber chemicals | 3 weight % | 2 weight % | 2 weight % |
| Filler | 70 weight % | 70.2 weight % | 70 weight % |
| Punched pieces | — | 30 weight % | — |
| Toluene | 0.4 l per 1 kg of the above mentioned mixture | | |

The above compositions are used to produce a reclaimed joint sheet as follows. At first, the composition for the first layer 7a is inserted between the hot roll 2 heated to 120°–150° C. and the cold roll 3 maintained at 30°–50° C. When a thickness of the composition reaches to 10–20% of a thickness of a desired sheet, the composition for the second layer 7b is inserted between the hot roll and the cold roll. When a thickness of the composition on the first layer reaches to 70–80% of the thickness of the desired sheet, the composition for the third layer 7c is inserted between the hot roll and the cold roll to form a reclaimed joint sheet. In this case, a pressure between the rolls 2, 3 is maintained at about 20–40 bar. Thereafter, the sheet laminate is subjected to a vulcanization treatment at an ambient temperature of 100°–150° C. in a drying furnace for 30–60 minutes.

In the present invention, the reason why the particle size in the fine pulverization of the punched pieces is limited to not more than 1.4 mm is due to the fact that when the particle size exceeds 1.4 mm, the particle size as an additive becomes too coarse to lower the quality of the reclaimed joint sheet. Further, the reason why the amount of the punched pieces added is limited to not more than 50 weight % is due to the fact that when the amount exceeds 50 weight %, the quality of the reclaimed joint sheet is degraded. That is, when the punched pieces are added in an amount of more than 50 weight %, as shown in FIG. 4, the adhesion of the composition to the cold roll is caused in the formation of the sheet and the quality of the resulting reclaimed joint sheet is frequently degraded.

As mentioned above, according to the invention, the punched pieces of the joint sheet after the punching of the joint sheet as a packing can be reused, so that not only the material yield is improved and the cost is decreased, but also industrial wastes are reduced. Further, each of the first and third layers in the reclaimed joint sheet according to the invention is made from a joint sheet containing no punched pieces of the joint sheet, so that the seal surface of the joint sheet becomes smooth and even, and hence the sufficient sealing performance can be developed.

What is claimed is:

1. A method of producing a reclaimed joint sheet, which comprises kneading a composition for the formation of the joint sheet comprising inorganic fibers or organic fibers or a mixture thereof, a rubber material, rubber chemicals and a filler, inserting the kneaded composition between a pair of a hot roll and a cold roll to heat and roll the composition to thereby laminate the composition on the hot roll in the form of a sheet, peeling off the laminated sheet from the hot roll to obtain a joint sheet, punching out the joint sheet into a shape to be used as a packing, finely pulverizing the resulting punched pieces of the joint sheet into particles having a particle size of not more than 1.4 mm by means of a grinder, and then adding the resulting particles to the same composition as mentioned above in an amount of not more than 50 weight % to reuse as a composition for the formation of a subsequent joint sheet.

* * * * *